J. M. Lunquest.
Double-Acting Pump.
No. 865. Reissued Dec. 13, 1859.
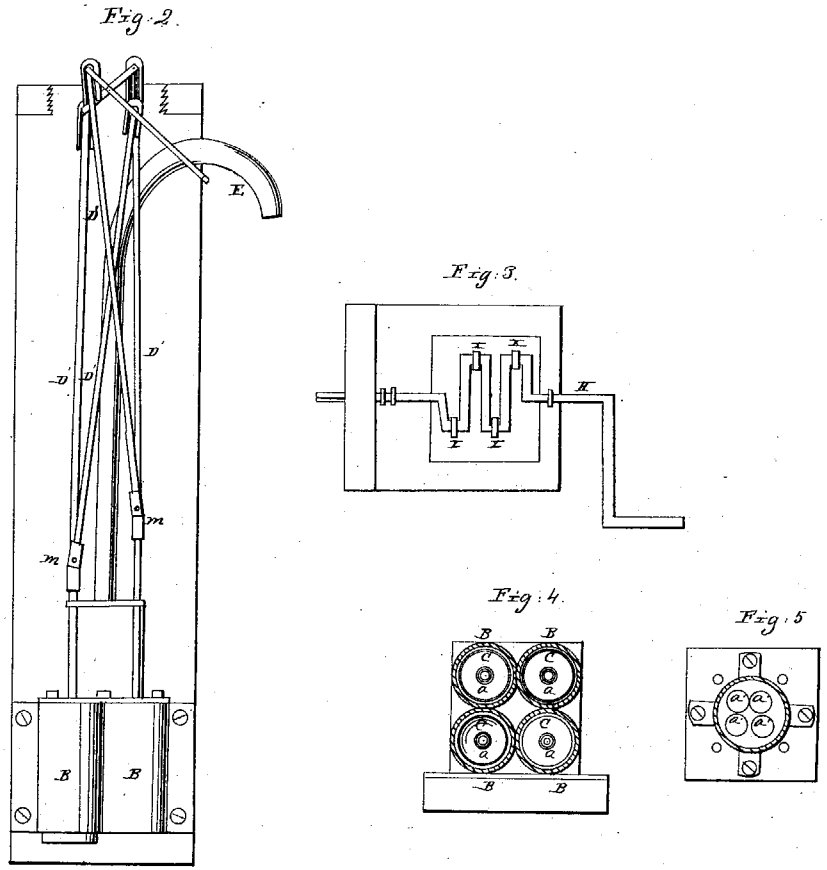
Witnesses:
C. M. Alexander
J. H. Alexander
Inventor:
John M. Lunquest
N. PETERS, PHOTO-LITHOGRAPHER, WASHINGTON, D. C.

UNITED STATES PATENT OFFICE.

JOHN M. LUNQUEST, OF GRIFFIN, GEORGIA.

IMPROVEMENT IN PUMPS.

Specification forming part of Letters Patent No. 23,100, dated March 1, 1859; Reissue No. 865, dated December 13, 1859.

*To all whom it may concern:*

Be it known that I, JOHN M. LUNQUEST, of Griffin, in the county of Spalding and State of Georgia, have invented certain new and useful Improvements in Pumps; and I do hereby declare that the following is a full, clear, and exact description of the same, reference being had to the annexed drawings, and to the letters of reference marked thereon.

The nature of my invention consists in the peculiar arrangement of the several parts, which will be hereinafter described.

In order that those skilled in the arts may make and use my invention, I will proceed to describe its construction and operation.

In the accompanying drawings, Figure 1 represents a section of the working parts of the pump. Fig. 2 is a side elevation. Fig. 3 represents a top view of the crank-handle. Fig. 4 is a bottom view of the four cylinders. Fig. 5 is a view of the bottom of the air-chamber, showing the valves in it.

In the figures, A represents the board or frame-piece to which the pump is attached.

B B B B represent four cylinders, which are placed together in the manner shown in Fig. 4. The length and size of these cylinders will depend upon the desired capacity of the pump.

D D represent piston-rods, which are connected at their lower extremities with the piston-heads C C, which are four in number, and which play in the cylinders B B. The piston-rods D are connected and form a joint with the rods D′ D′ D′ D′ at their upper extremity.

H is a crank-handle, which is secured in proper bearings at the top of the pump. This handle has four cranks, as will be seen, which are represented by *x x x x*. To these four cranks attach the upper ends of the rods D′ D′ D′ D′. The piston-heads C C are provided with apertures *i i*, through which water passes into the pump. These apertures are covered with four balls, which serve as valves, and are represented by *a a*.

F represents an air-chamber, which is located above the cylinders B B, and which connects with said cylinders, *n n* representing openings (which are four in number) between said air-chamber and the cylinders. These openings *n n* are closed by the ball-valves *a a*.

E represents a pipe for discharging the water. Said pipe passes into the air-chamber and extends down into it almost to its bottom. When this pump is placed in order to be operated, the cylinders and air-chamber are submerged in the water, as is represented in Fig. 1. When this is done, the operator turns the crank-handle H, and the piston-heads C C are set in motion. The water enters the cylinders B B through the apertures *i i* and close them, the water in the cylinders being raised and forced through the openings *n n* in the bottom of the air-chamber F. So long as the water is being forced into the air-chamber the balls do not cover the openings *n n*, but the moment the piston-heads begin to descend the balls *a a* fall into the openings *n n* and prevent the water from returning into the cylinders. As the operation continues the air-chamber F becomes partially filled with water, and when the air above the mouth of the pipe becomes compressed the water is forced up the pipe E and is discharged above its desired point. It is evident that as the weight of the water is lifted by the pistons, the rods D D need not be very large and heavy. They require strength sufficient to raise the water, and then to force the piston-head down again into the bottom of the cylinders. The balls *a a* are confined in so small a space within the chamber F and so close together that the sides of the chamber and the balls themselves keep each other in proper position to cover their respective openings.

Having thus fully described my invention, what I claim as new, and desire to secure by Letters Patent, is—

The arrangement of two or more cylinders, B B, piston-heads C C, ball-valves *a a*, air-chamber F, and valves *a′ a′*, said valves being kept in position by proximity to each other and the sides of the chamber F, substantially in the manner and for the purpose herein specified.

JOHN M. LUNQUEST.

Witnesses:

C. M. ALEXANDER,

A. A. YEATMAN.